Figure 4:
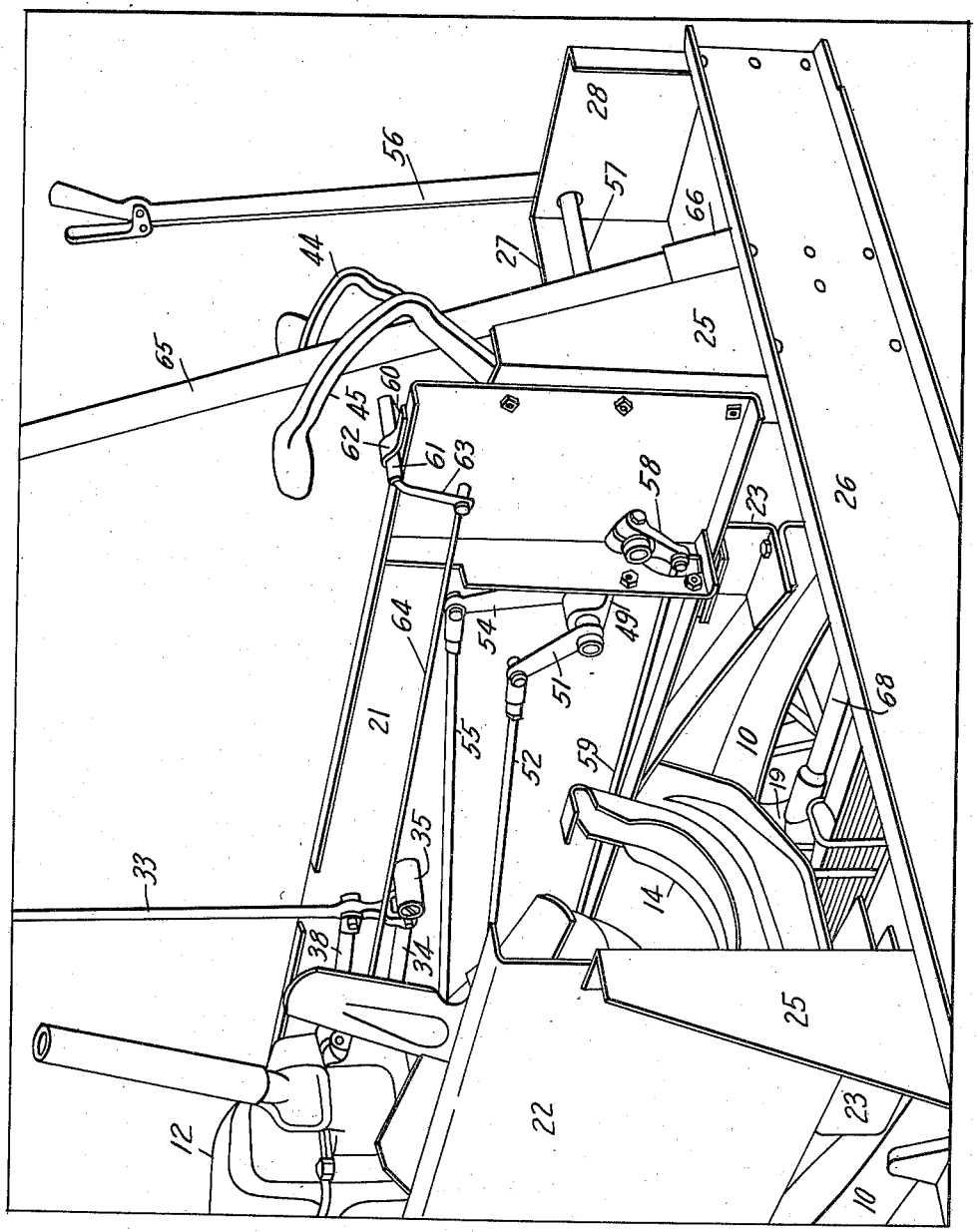

Nov. 22, 1938.   G. A. GEMMER   2,137,337
GEAR SHIFTING MECHANISM
Filed July 23, 1936   4 Sheets-Sheet 1
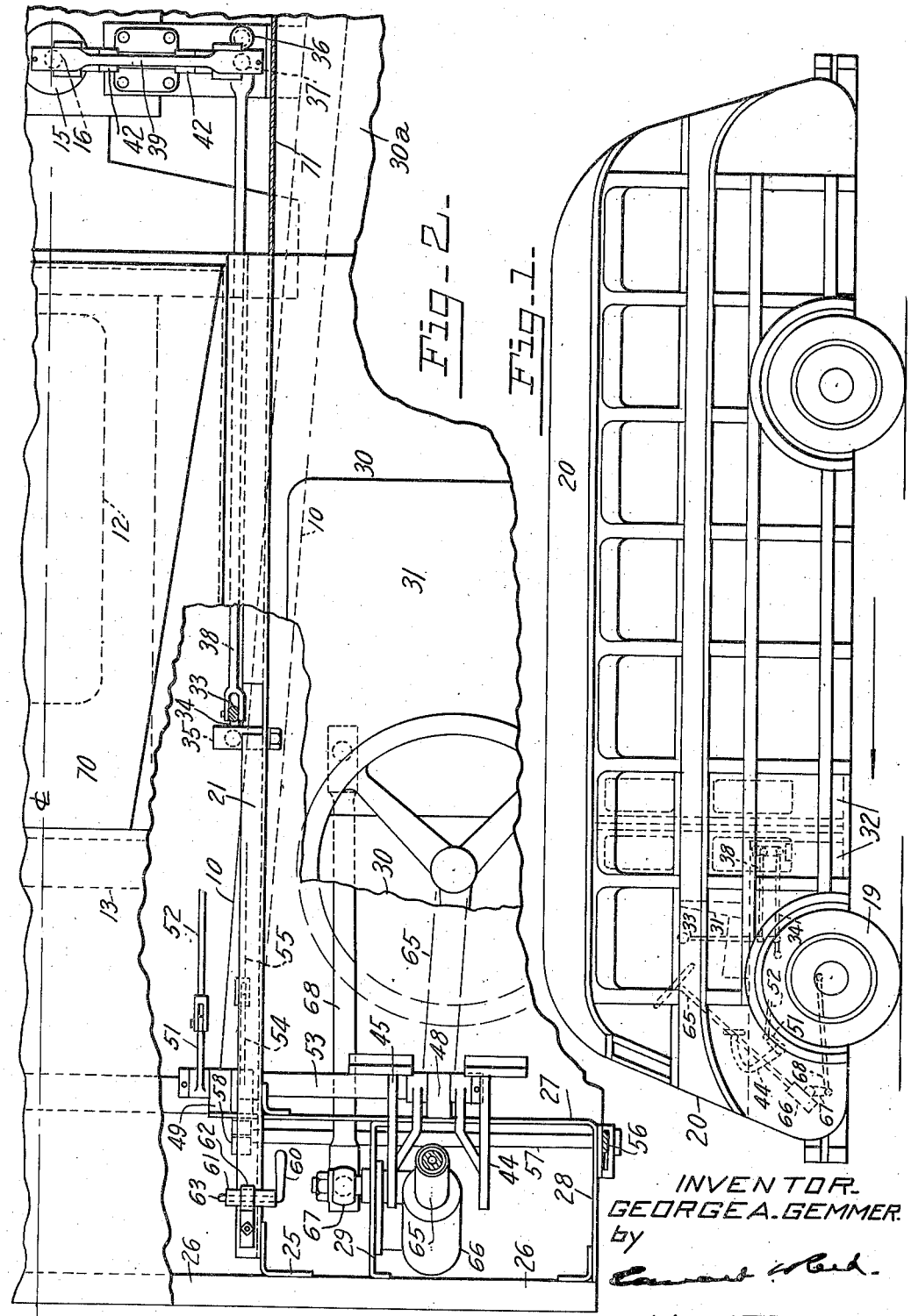
INVENTOR.
GEORGE A. GEMMER.
by
his ATTORNEY

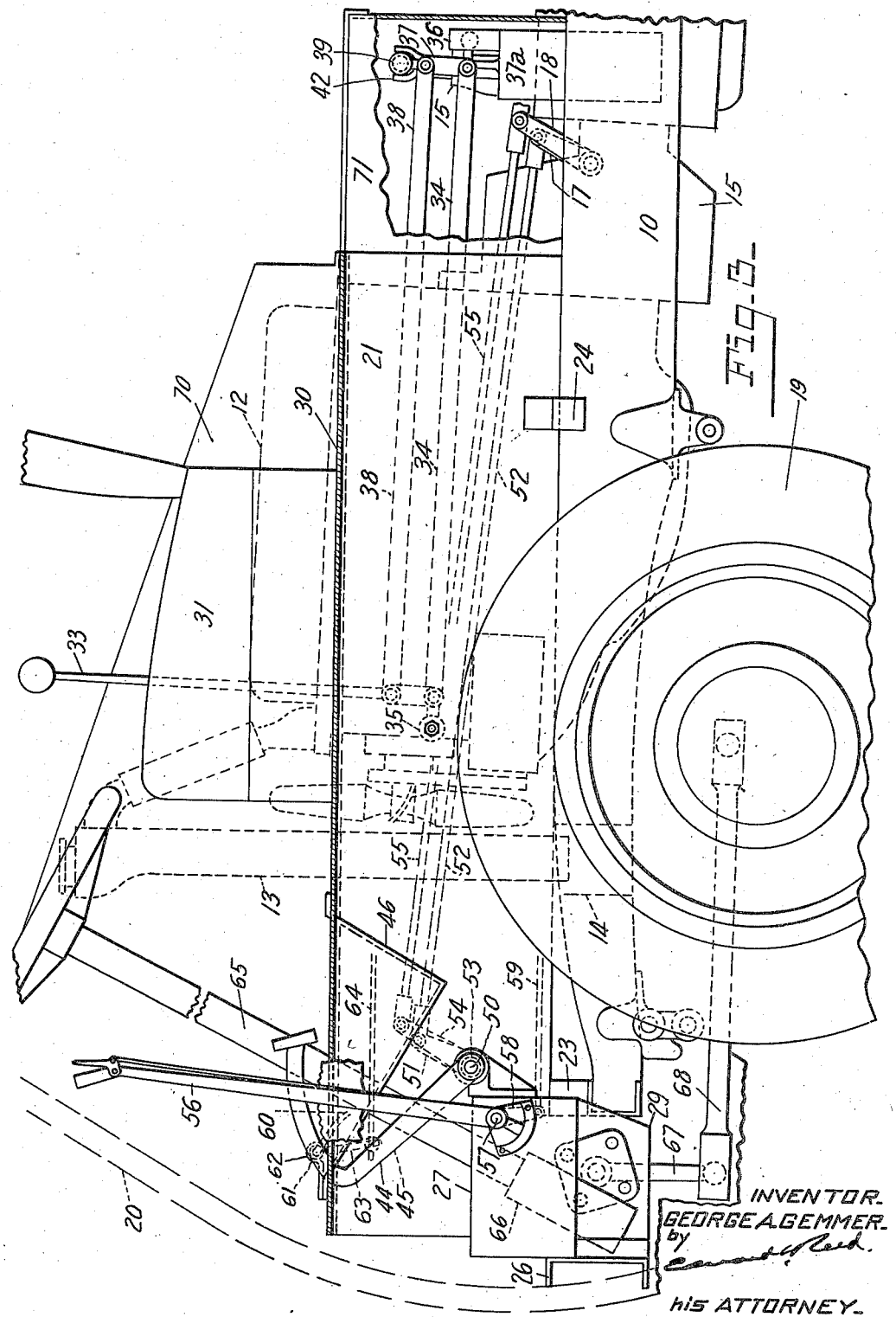

Nov. 22, 1938.　　　G. A. GEMMER　　　2,137,337
GEAR SHIFTING MECHANISM
Filed July 23, 1936　　　4 Sheets-Sheet 3

INVENTOR
GEORGE A. GEMMER
by
Edward W. Reed
his ATTORNEY.

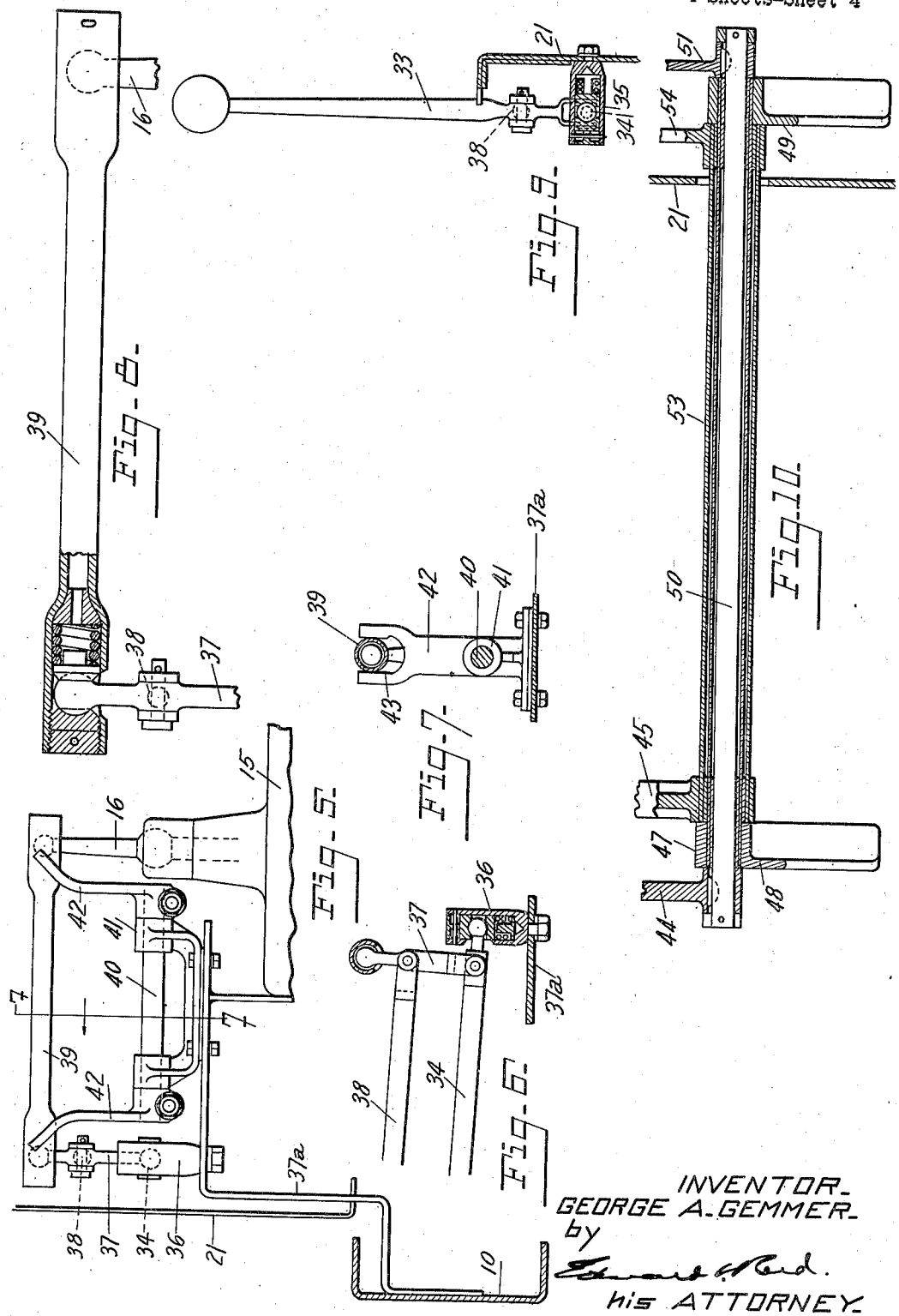

Patented Nov. 22, 1938

2,137,337

UNITED STATES PATENT OFFICE 2,137,337

GEAR SHIFTING MECHANISM

George A. Gemmer, Richmond, Ind.

Application July 23, 1936, Serial No. 92,169

11 Claims. (Cl. 74—473)

This invention relates to gear shifting mechanism for motor vehicles and is designed more particularly for installation on a standard chassis when the latter is converted, or modified, to receive a body which extends for the full length of the chassis, but it is not limited to such use.

The standard truck chassis has the mechanisms for controlling the movements thereof mounted to the rear of the engine and thus spaced a substantial distance from the front end of the chassis frame. When a full length body is mounted on such a chassis it is desirable, if not essential, that the driver's seat be arranged near the front end of the chassis and that the devices for operating the controlling mechanisms be mounted adjacent to the driver's seat, thus locating the operating devices a substantial distance in front of the mechanisms to be controlled thereby. When a gear shifting lever is so located it is desirable that its shifting movements shall be the same as those of the usual shifting lever.

One object of the invention is to provide means whereby a gear shifting lever may be mounted at a point remote from the transmission mechanism and so connected with the latter that when the lever is moved according to standard practice the device for shifting the gears of the transmission will be moved in the usual manner.

A further object of the invention is to provide such a gear shifting mechanism which may be applied to a standard gear shift so as to permit the shifting lever to be located in front of the engine when a standard truck is provided with a body which extends forwardly beyond the engine, with the driver's seat near the front end thereof.

A further object of the invention is to provide such a gear shifting mechanism which will be simple in construction and operation and which may be easily installed and connected with the transmission mechanism.

Other objects of the invention may appear as the apparatus is described in detail.

In the accompanying drawings Fig. 1 is a side elevation of a bus embodying my invention; Fig. 2 is a plan view, partly broken away, of a portion of a truck chassis showing the invention applied thereto; Fig. 3 is a side elevation, partly broken away, of the front portion of the chassis with the invention applied thereto; Fig. 4 is a perspective view of the front end of the modified chassis, as shown in Fig. 3; Fig. 5 is a rear elevation of the means for connecting the gear shift lever with the transmission mechanism; Fig. 6 is a side elevation, partly in section, of the rear portion of the mechanism for connecting the gear shift lever with the transmission mechanism; Fig. 7 is a section taken on the line 7—7 of Fig. 5; Fig. 8 is a detail view, partly in section, of a transverse rod forming a part of said connecting mechanism; Fig. 9 is a front elevation, partly in section, of the gear shift lever and its connecting mechanism; and Fig. 10 is a sectional detail view, partly broken away, of the clutch and brake operating devices.

In these drawings I have illustrated one embodiment of my invention and have shown the same as applied to a standard truck chassis which comprises a main frame 10, an engine 12 mounted on said frame, a radiator 13 carried by a supporting structure 14 in front of the engine, and transmission mechanism 15, in the rear of the engine, this transmission mechanism being provided with the usual actuating member 16 for shifting the gears of the transmission mechanism. Also mounted on the chassis in the rear of the engine are rock arms 17 and 18 for actuating respectively the clutch and brake mechanisms, which are not here shown. The front or steering wheels 19 of the chassis are mounted in the usual manner and provided with the usual steering mechanism including the transverse drag bar, which are not here shown.

For the purpose of adapting this chassis to receive the full length bus body, as shown at 20 in Fig. 1, and to support the operating devices in the desired positions at the front end of the body, I have provided an adapting or converting unit of such a character that it may be mounted on any truck chassis of standard design and the operating devices forming a part thereof connected with the controlling mechanisms on the chassis without substantial modification of the unit regardless of minor variations in the construction of different truck chassis. Preferably this adapting or converting unit comprises a supplemental frame having side members 21 and 22 adapted to be supported on and to extend lengthwise of the side members of the main frame 10. As here shown, these side members are in the form of relatively wide channels arranged on edge and rigidly secured to the side members of the main frame by brackets 23 and 24. If desired, the side members may be welded to the main frame, either with or without the brackets. These side members of the supplemental frame may be supported either directly above or at one side of the main frame members and by providing brackets of the necessary shape and size the supplemental frame may be mounted on truck frames of different widths without other modification of the supplemental frame. Each of the side members 21 and 22 of the supplemental frame is provided at its forward end with a bracket 25 which extends downwardly below the same and the downwardly extending portions of these brackets are rigidly connected one to the other by a transverse frame member 26 which extends laterally beyond both side members of the supplemental frame. One of the side members of the supplemental frame, usually the one on the left hand side thereof, is provided with a laterally extending portion which is here shown as comprising a member 27 rigidly secured at its inner end to the side member 21, extending laterally therefrom to a point adjacent to the side wall of the bus body and having at its outer end a forwardly extending part 28 which is rigidly secured to the adjacent end of the transverse member 26, the several members thus forming a rectangular structure. This structure is provided between its inner and outer ends with a transverse member or partition 29 rigidly secured to the members 26 and 27.

The main floor of the bus body, a portion of which is shown at 30a, is mounted on the main frame 10, but the floor at the front end of the body is elevated and supported above the supplemental frame members, as shown at 30 in Fig. 3, so as to raise the same above the front wheels and to support the driver's seat 31 at a proper height with relation to the operating devices which are mounted on the supplemental frame. This elevated floor may comprise a single narrow section arranged between the engine and the side wall of the body but usually such a floor is arranged on both sides of the engine. The floor on the right hand side of the engine would then terminate just in front of the doors which are shown at 32 in Fig. 1 and the elevated floor at the left hand side of the body may extend rearwardly beyond the front edge of the doors if desired, as it will not obstruct the passageway leading into the bus.

The several operating devices may be mounted on the supplemental frame in any desired positions but usually it is preferred to arrange the same substantially in the same relation to the seat that they occupy in the standard truck where the seat is arranged to the rear of the engine. In the present arrangement a gear shift lever 33 is mounted at the inner side of the seat near the front end of the engine and is so mounted that it is capable of the same fore and aft and transverse movements which are imparted to the gear shift lever of the standard truck to control the transmission mechanism. In the present arrangement the gear shift lever is supported by the members which connect the same with the transmission mechanism. The connecting mechanism between the lever and the transmission mechanism comprises a longitudinal torque rod 34 which is mounted for rocking movement about its longitudinal axis and is held against movement in the direction of its length. In the construction shown a supporting member or stud 35 is rigidly secured to the supplemental frame member 21 and projects inwardly therefrom. A similar supporting member or stud 36 is mounted adjacent to and in laterally spaced relation to the transmission mechanism 15 and is here shown as mounted in an upright position on a bracket 37a which is supported at one end on the main frame 10 and at its other end on the casing of the transmission mechanism. The torque rod 34 is mounted at its ends on these supporting members by means of universal joints, preferably ball and socket joints, which permit its free rotatory movement but prevent its longitudinal movement. The gear shift lever 33 is pivotally mounted at its lower end on the torque rod 34, adjacent to the supporting stud 35, for movement about an axis transverse to the rod, and the connection is such that the rod will be rocked about its longitudinal axis by the transverse movement of the lever. An upright link 37 is pivotally mounted on the torque rod, adjacent to the supporting stud 36, for movement about an axis transverse to the rod and for movement with the rod when the latter is rocked about its longitudinal axis. This link is connected with the gear shift lever 33 by a second longitudinal rod 38 arranged above and spaced a short distance from the rod 34, and pivotally connected at its ends with the link and the lever. Pivotally connected with the upper end of the link 37, preferably by a ball and socket joint, is a third rod 39 which extends transversely to the longitudinal rods 34 and 38 and is pivotally connected with the gear shifting member 16 of the transmission mechanism. Preferably the upper portion of the usual gear shift lever is removed to provide a relatively short member, as shown in Fig. 5, and the latter is provided at its upper end with a spherical bearing head for connection with the transverse rod 39. It will be apparent therefore that when fore and aft movement is imparted to the gear shift lever 33 this movement will be transmitted through the rod 38 to the link 37 and the latter will impart movement to the rod 39 transversely to the length of the latter and this rod will impart similar fore and aft movement to the gear shifting member 16, the parts being so proportioned that the same movements will be imparted to the gears as would be imparted thereto by the gear shifting member 16 if the latter was directly actuated by hand. When transverse movement is imparted to the gear shift lever the torque rod 34 will be rocked about its longitudinal axis and the link 37 will move therewith and thus impart longitudinal movement to the rod 39 which in turn will impart transverse movement to the gear shifting member 16. Thus by imparting the ordinary gear shifting movements to the lever 33 the gears of the transmission mechanism may be shifted in the usual manner. Means are provided for causing both ends of the transverse rod 39 to move in unison and equal distances, and for guiding the same in its longitudinal movement. This means is preferably in the form of a yoke-shaped structure mounted for rotatory movement about an axis substantially parallel with the rod 39 and having its arms connected with that rod near the ends thereof. In the present construction this yoke comprises a shaft 40 mounted in bearings 41 carried by the bracket 37a. Rigidly secured to the respective ends of this shaft are upwardly extending arms 42, the upper portions of which are deflected outwardly and slotted, as shown at 43, to receive between them enlarged bearing portions of the rod 39. The slots are of such a size that the rod may have free longitudinal movement therein but can have no appreciable transverse movement with relation thereto.

Foot levers 44 and 45 are pivotally mounted on the supplemental frame in front of the driver's seat in positions in which they may be conveniently operated by the driver, the elevated floor 30 being, in the present instance, provided with a depressed foot board 46. These levers are connected respectively with the clutch actuating arm 17 and the brake actuating arm 18 on the truck chassis in such a manner that the movement of the foot levers will actuate the clutch and brake mechanism in the usual manner. The foot levers may be mounted in any suitable manner but preferably they are mounted on separate rock shafts and for the purpose of convenience and compactness these shafts are preferably arranged in telescoping relation one to the other. As shown in Fig. 10, a tubular supporting member 47 is rigidly mounted in brackets 48 and 49 and extends through the supplemental frame member 21. Rotatably mounted within this tubular member is a rock shaft 50 which projects beyond the respective ends of the tubular member. The clutch operating foot lever 44 is rigidly secured to the outer end of this shaft 50 and a rock arm 51 is rigidly secured to the inner end of the shaft, and a rod or link 52 connects the rock arm 51 with the clutch actuating arm 17 of the chassis. A tubular rock shaft 53 is mounted on the tubular member 47 between the brackets 48 and 49 and the brake operating lever 45 is rigidly secured to the outer end of this tubular shaft and a rock arm 54 is rigidly secured to the inner end thereof and is connected by a rod or link 55 with the brake actuating arm 18 of the chassis. A hand operated brake lever 56 is arranged just beyond the member 28 of the supplemental frame and is rigidly secured to a shaft 57 which extends through that member and through the side member 21 and is provided with a rock arm 58 to which is connected a rod 59 leading to the brake mechanism. Also mounted on the side member 21 of the main frame is a throttle lever 60 adapted to be actuated by the usual push rod or foot rest mounted on the foot board 46, but not here shown. This lever is carried by a shaft rotatably mounted in a bearing 61 secured to the upper edge of the side member 21 by a clamp 62 and is provided on the inner side of that member with a rock arm 63 from which a rod 64 leads to the throttle valve, the parts 60 and 63 being preferably formed in one piece.

The steering column 65 is arranged on the supplemental frame in front of the transverse seat and is provided at its lower end with a steering device 66 of any suitable character and in some instances the steering device of the standard truck chassis may be moved forwardly and mounted on the supplemental frame. This steering device comprises the usual arm 67 and is connected by a drag link 68 with the steering device on one of the wheels, which is connected with the other wheel by the usual tie bar, which is not shown.

The engine and radiator are enclosed in a hood 70, the front end of which opens through the front wall of the bus body 20 and the top wall of the hood slopes downwardly toward the rear, the hood thus providing a wind tunnel through which air may circulate through the radiator and about the engine. This air may be discharged beneath the floor of the body, the hood being preferably sealed to prevent fumes from the engine entering the body. A housing 71 extends rearwardly from the hood to enclose that portion of the transmission mechanism which projects above the main floor but this mechanism is near the center of the body and the housing does not obstruct the passageway leading from the doorway into the body.

While I have shown and described one embodiment of my invention, I do not desire to be limited to the details thereof, as various modifications may occur to a person skilled in the art.

Having now fully described my invention, what I claim as new and desire to secure by Letters Patent, is:

1. In combination with a transmission mechanism having a gear shifting member capable of fore and aft and transverse movements, a rod mounted for movement about a longitudinal axis and held against movement lengthwise of said axis, a link mounted on said rod for movement with relation thereto about a transverse axis only, a transverse rod pivotally connected with said link and said gear shifting member, a gear shifting lever supported by said rod and connected therewith for movement with relation thereto about a transverse axis only, and a second rod pivotally connected with said lever and said link, whereby fore and aft movement of said lever will move said transverse rod transversely to its length and the transverse movement of said lever will move said transverse rod in the direction of its length.

2. In combination with a transmission mechanism having a gear shifting member capable of fore and aft and transverse movements, a pair of rods one of which is movable about a longitudinal axis and is held against movement in the direction of its length and the other of which is movable lengthwise of and about the axis of the first mentioned rod, a gear shifting lever spaced from said transmission mechanism and connected with said rods to impart said movements thereto, a link connected with said rods for movement therewith, a transverse rod pivotally connected with said link and with said gear shifting member and movable by said link in the direction of its length when said first mentioned rod is rotated and transversely to its length when longitudinal movement is imparted to the last mentioned longitudinal rod, and means for causing the end portions of said transverse rod to move in unison.

3. In combination with a transmission mechanism having a gear shifting member capable of fore and aft and transverse movements, a pair of rods one of which is movable about a longitudinal axis and is held against movement in the direction of its length and the other of which is movable lengthwise of and about the axis of the first mentioned rod, a gear shifting lever spaced from said transmission mechanism and connected with said rods to impart said movements thereto, a link connected with said rods for movement therewith, a transverse rod pivotally connected with said link and with said gear shifting member and movable by said link in the direction of its length when said first mentioned rod is rotated and transversely to its length when longitudinal movement is imparted to the last mentioned longitudinal rod, and a yoke mounted for movement about an axis substantially parallel with said transverse rod and connected with said transverse rod to cause the end portions of the latter to be moved transversely to its length in unison.

4. In combination with a transmission mechanism having a gear shifting member capable of fore and aft and transverse movements, a pair of rods one of which is movable about a longitudinal axis and is held against movement in the direction of its length and the other of which is movable lengthwise of and about the axis of the first mentioned rod, a gear shifting lever spaced from said transmission mechanism and connected with said rods to impart said movements thereto, a link connected with said rods for movement therewith, a transverse rod pivotally connected with said link and with said gear shifting member and movable by said link in the direction of its length when said first mentioned rod is rotated and transversely to its length when longitudinal movement is imparted to the last mentioned longitudinal rod, and a yoke mounted for movement about an axis substantially parallel with said transverse rod and having slotted arms embracing the ends of said transverse rod.

5. In an automobile, a transmission mechanism having a gear shifting member mounted for fore and aft and transverse movements, a rod mounted for movement about its longitudinal axis and held against axial movement, a gear shift lever connected at its lower end with said rod to move the latter about its longitudinal axis and for movement with relation to said rod about an axis transverse to said rod, a link connected at one end with said rod for movement therewith about the longitudinal axis of said rod and for movement with relation to said rod about an axis transverse to said rod, a second rod connecting said link with said gear shifting member, and a third rod connected with said link between the first mentioned rod and said second rod and connected with said gear shift lever at a point spaced from said first mentioned rod.

6. In an automobile, a transmission mechanism having a gear shifting member mounted for fore and aft and transverse movements, a rod mounted for movement about its longitudinal axis and held against axis movement, a gear shift lever connected at its lower end with said rod to move the latter about its longitudinal axis and for movement with relation to said rod about an axis transverse to said rod, a link connected at one end with said rod for movement therewith about the longitudinal axis of said rod and for movement with relation to said rod about an axis transverse to said rod, a second rod connecting said link with said gear shifting member, a third rod connected with said link between the first mentioned rod and said second rod and connected with said gear shift lever at a point spaced from said first mentioned rod, and a movable device connected with said second rod near the ends of the latter to cause said ends to move in unison when transverse movement is imparted to said rod by said link.

7. In combination with a transmission mechanism having a gear shifting member capable of fore and aft and transverse movements, a rod mounted for two movements including bodily movement about a longitudinal axis spaced laterally therefrom, means for imparting said movements to said rod, and a member extending transversely to said rod in a line remote from said movement imparting means, connected with said rod for longitudinal and transverse movements thereby and connected with said gear shifting member to move the latter in the direction in which said rod moves.

8. In combination with a transmission mechanism having a gear shifting member capable of fore and aft and transverse movements, a rod mounted for longitudinal movement and for bodily movement about a longitudinal axis spaced laterally therefrom, means for imparting said movements to said rod, an elongate member connected near one end with said rod for longitudinal and transverse movements therewith and connected near its other end with said gear shifting member, and means acting on said elongate member to cause the two ends thereof to move equal distances when transverse movement is imparted thereto.

9. In combination with a transmission mechanism having a gear shifting member capable of fore and aft and transverse movements, a pair of longitudinal rods one of which is movable about a longitudinal axis and is held against movement in the direction of its length and the other of which is movable lengthwise of and about the axis of the first mentioned rod, a gear shifting lever spaced from said transmission mechanism and connected with said rods to impart said movements thereto, a link connected with said rods for movement therewith, a transverse member pivotally connected with said link and with said gear shifting member and movable by said link in one direction when said first mentioned rod is rotated and in another direction when longitudinal movement is imparted to the last mentioned rod.

10. In combination with a transmission mechanism having an upwardly extending gear shifting member, a supporting member spaced laterally from said gear shifting member, a second supporting member, a rod connected at its ends with said supporting members by universal joints and held against longitudinal movement, a gear shifting lever connected with said rod for movement with relation thereto about a transverse axis and adapted to move said rod about its longitudinal axis, a link pivotally connected with said rod for movement with relation thereto about a transverse axis and movable therewith about the longitudinal axis of said rod, a second rod pivotally connected with said lever and said link, a third rod extending transversely to the first mentioned rods and connected at its ends with said link and with said gear shifting member, and means acting on said third rod to cause said gear shifting member to move in unison with said link when the latter moves about its pivotal axis with relation to said first mentioned rod.

11. In combination with a transmission mechanism having an upright gear shifting member capable of fore and aft and transverse movements about axes spaced below the upper end thereof, a pair of rods one of which is movable about a longitudinal axis and is held against movement in the direction of its length and the other of which is movable lengthwise of and about the axis of the first mentioned rod, a lever spaced from the transmission mechanism and connected with the adjacent ends of said rods to impart said movements thereto, a support for that end of the first mentioned rod which is remote from said lever, and means adjacent said support for connecting said rods one with the other and with said gear shifting member to cause the latter to move in the same direction that the lever moves.

GEORGE A. GEMMER.